(12) United States Patent
Hughes et al.

(10) Patent No.: US 7,792,265 B2
(45) Date of Patent: Sep. 7, 2010

(54) CALL COMPLETION SERVICE IN CASE OF CALLED PARTY UNAVAILABILITY

(75) Inventors: David E Hughes, Ipswich (GB); John C Lee, Eye (GB)

(73) Assignee: British Telecommunications plc, London (GB)

( * ) Notice: Subject to any disclaimer, the term of this patent is extended or adjusted under 35 U.S.C. 154(b) by 12 days.

(21) Appl. No.: 12/280,446

(22) PCT Filed: Feb. 9, 2007

(86) PCT No.: PCT/GB2007/000469

§ 371 (c)(1),
(2), (4) Date: Aug. 22, 2008

(87) PCT Pub. No.: WO2007/104912

PCT Pub. Date: Sep. 20, 2007

(65) Prior Publication Data

US 2009/0022296 A1    Jan. 22, 2009

(30) Foreign Application Priority Data

Mar. 10, 2006    (EP)    .................................. 06251293

(51) Int. Cl.
*H04M 3/42* (2006.01)
*H04M 3/48* (2006.01)
(52) U.S. Cl. .............................. 379/210.01; 379/207.04
(58) Field of Classification Search ............ 379/209.01, 379/210.01, 207.04
See application file for complete search history.

(56) References Cited

U.S. PATENT DOCUMENTS 6,188,756 B1    2/2001    Mashinsky

| 6,674,746 B1 | 1/2004 | Lamarque, III |
| 6,853,851 B1 | 2/2005 | Rautiola et al. |
| 7,171,227 B2 * | 1/2007 | Baratz et al. ................ 455/512 |
| 2001/0053213 A1 | 12/2001 | Truong et al. |

(Continued)

FOREIGN PATENT DOCUMENTS

EP    0 766 490 A2    4/1997

(Continued)

OTHER PUBLICATIONS

International Search Report for PCT/GB2007/000469, mailed Mar. 29, 2007.

(Continued)

*Primary Examiner*—Harry S Hong
(74) *Attorney, Agent, or Firm*—Nixon & Vanderhye PC

(57) ABSTRACT

If an attempt by a first user to contact another party fails, a callback server sets a flag. The callback server monitors terminals that have such flags set and is arranged to transmit an alert to the calling party when the called party next becomes available. However, if at the time when the called party becomes available, the calling party is himself no longer available, being now switched off or busy, an additional flag in the store, indicative of activity by the calling party, prevents a callback alert from being generated until the monitoring process can obtain availability indications in respect of both parties simultaneously. Availability may be determined by factors such as available bandwidth or terminal capabilities. A callback may be initiated when a predetermined number of called parties become available to participate in a conference call.

12 Claims, 5 Drawing Sheets

U.S. PATENT DOCUMENTS

| | | |
|---|---|---|
| 2002/0022483 A1 | 2/2002 | Thompson et al. |
| 2002/0077129 A1 | 6/2002 | Kikuta et al. |
| 2002/0085516 A1 | 7/2002 | Bridgelall |
| 2003/0023691 A1 | 1/2003 | Knauerhase |
| 2003/0087629 A1 | 5/2003 | Juitt et al. |
| 2003/0119489 A1 | 6/2003 | Mohammed |
| 2003/0191676 A1* | 10/2003 | Templeton .................... 705/8 |
| 2003/0206619 A1 | 11/2003 | Curbow et al. |
| 2004/0066927 A1 | 4/2004 | Horvath et al. |
| 2004/0213208 A1 | 10/2004 | Baratz et al. |
| 2005/0086346 A1 | 4/2005 | Meyer |

FOREIGN PATENT DOCUMENTS

| | | |
|---|---|---|
| EP | 1 689 206 A1 | 8/2006 |
| EP | 1 845 674 A1 | 10/2007 |
| EP | 1 860 905 A1 | 11/2007 |
| EP | 1 912 401 A1 | 4/2008 |
| WO | 00/22802 | 4/2000 |
| WO | 02/07396 A1 | 1/2002 |
| WO | 02/093811 A2 | 11/2002 |
| WO | 03/021900 A1 | 3/2003 |
| WO | 03/061177 A2 | 7/2003 |
| WO | 2004/082219 | 9/2004 |

OTHER PUBLICATIONS

U.S. Appl. No. 12/299,969, Lee et al. filed Nov. 7, 2008.
U.S. Appl. No. 12/299,979, Hughes et al. filed Nov. 7, 2008.
European Search Report dated Jul. 12, 2006 in EP 06 25 1293.
European Search Report dated Oct. 18, 2006 in EP 06 25 2679.
European Search Report dated Sep. 26, 2006 in EP 06 25 2678.
European Search Report dated Dec. 7, 2006 in EP 06 25 2680.
European Search report dated Jun. 21, 2006 in EP 06 25 2051.
Haase O., et al., "Multi-protocol profiles to support user mobility across network technologies," Mobile Data Management, 2004, Proceedings, 2004 IEEE International Conference on Berkeley, CA, US, Jan. 19-22, 2004, Los Alamitos, CA, IEEE Comput. Soc., US, Jan. 19, 2004, pp. 100-105, XP010681048, ISBN: 0-7695-2070-7.
European Search Report dated May 23, 2007 in EP 06 25 5208.
CISCO Systems: "CISCO Aironet 1100 Series Access Point Installation and Configuration Guide," Internet Citation, Oct. 1, 2002, XP002381713.
International Search Report for PCT/GB2007/001414 mailed Jul. 31, 2007.
International Search Report for PCT/GB2007/001404, mailed Jul. 27, 2007.

* cited by examiner

CALL COMPLETION SERVICE IN CASE OF CALLED PARTY UNAVAILABILITY

This application is the U.S. national phase of International Application No. PCT/GB2007/000469 filed 9 Feb. 2007 which designated the U.S. and claims priority to EP 06251293.4 filed 10 Mar. 2006, the entire contents of each of which are hereby incorporated by reference.

BACKGROUND 1. Technical Field

This invention relates to callback facilities in telecommunications systems. 2. Related Art It is well known to provide a facility in a telephone system to allow a caller, on receiving an indication that a call attempt has failed, to be given the opportunity to request notification of the availability of the called party, so that he can make a further, hopefully more successful, attempt to place the call. The call failure mode may be "busy" ("off hook"), "no answer" (remains "on hook" despite ringing) or, in the case of a mobile telephone, "no contact" (switched off or not in range). The notification of the availability of the called party is typically triggered by the called party goes through the transition from an "off hook" state to an "on hook" state at some time subsequent to the request for such notification. In the case of a "no contact" situation, notification may be triggered by the called handset establishing contact with a cellular base station when it is switched on or comes into range.

Such systems are very useful, but have limitations because the calling party may not be in a position to place the desired call at the time the notification is received. This may be simply because the calling party may himself now be "off hook", unavailable or switched off. In such a situation the callback may fail, but some systems are arranged to only attempt a "callback" when both parties are idle.

Systems of this general type are well-known—a typical example is described in International Patent specification WO00/22802 (Templeton).

BRIEF SUMMARY

There are other circumstances when it might not be appropriate to act on a callback notification, in particular if either or both parties are using a system which allows a mobile user to use different communications modes according to availability. For example, a user may have a handset which allows a broad bandwidth connection to be made when in proximity to a suitable access point, but a narrower bandwidth connection to be used when that is all that is available. The handset may also interface with fixed equipment to allow enhanced communications when such equipment is available. For example, the handset may default to the public cellular network, but have wireless access ("WiFi") capability to allow the user to connect to higher bandwidth systems and terminal equipment when they are available. This variability of user experience may mean that when a user receives notification that a called party is available, the calling party is no longer in a position to make the call because of current limitations in bandwidth and/or terminal equipment.

According to the present exemplary embodiment, there is provided a telecommunications system providing a callback facility having means for detecting an attempt made by a first party to make a call of a predetermined type to one or more other parties, means for detecting a failure of said call attempt, means for monitoring each party to the call attempt to determine whether they meet criteria indicating that they are capable of participation in a call of the type attempted, and a means to generate a notification to the first party when the first party and one or more of the other parties meet the capability criteria. The invention also provides a method of operating a telecommunications system providing a callback facility in which, in the event of failure of a call attempt of a predetermined type being made by a first party to one or more other parties, each party to the call attempt is monitored to determine whether they meet criteria indicating that they are capable of participation in a call of the type attempted, and a notification is sent to the first party when the first party and at least one of the other parties meet the capability criteria. The capability conditions monitored may relate to availability or cost of predetermined bandwidth, or the capabilities of the terminal equipment currently available to each user.

In a preferred embodiment, the predetermined conditions may include temporal conditions. For example, a condition on bandwidth may be relaxed after a predetermined period, to ensure that should the required bandwidth not be available to the called party at any time within that period, a more limited contact is still made at the end of that period. Conditions may be made that are interdependent, for example in a multi-party call, it may be arranged that notification is made when a predetermined number of the parties, or a specified sub-group of the total, meet the predetermined conditions.

BRIEF DESCRIPTION OF THE DRAWINGS

An embodiment of the invention will now be described by way of example, with reference to the drawings, in which.

DETAILED DESCRIPTION OF EXEMPLARY EMBODIMENTS

Figure 1:
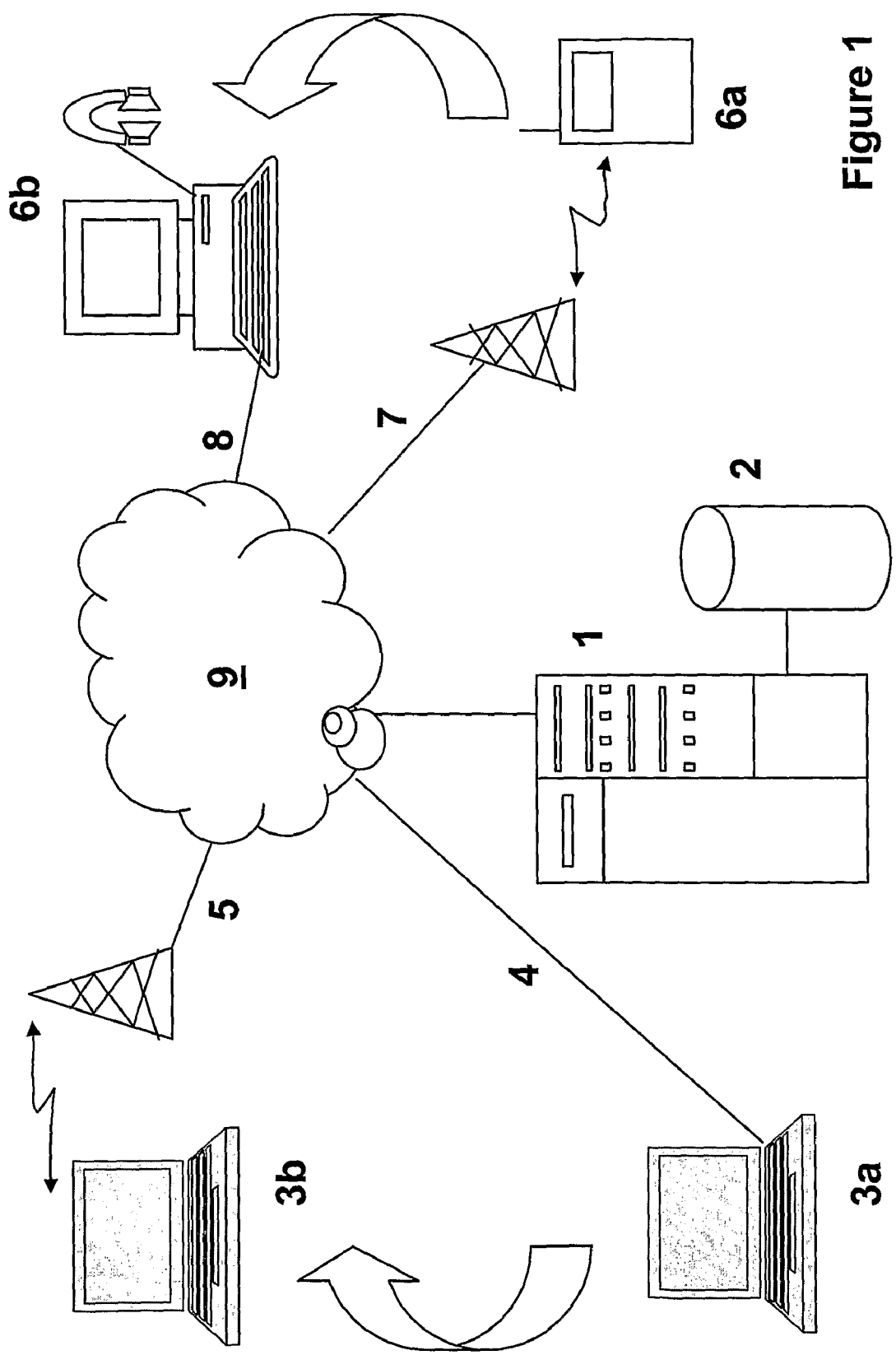
FIG. 1 is a schematic diagram of a communications system embodying the invention.

FIG. 1 depicts a server 1 configured to operate according to the invention by controlling the callback facility. A register 2 is associated with the server: the register stores data corresponding to the stored conditions under which a callback alert should be generated.

A first party 3a, 3b is depicted as connected to the network 9 through different communications media 4, 5, at different times. For illustrative purposes it will be assumed that the same terminal equipment is used in both cases, but that the first medium 4 is of a greater bandwidth than the second medium 5.

A called user 6a is also depicted as connected to the network 9 through a medium 7. At other times the user of the terminal 6a may be connected to the network, through a connection 8, using either the same terminal or, as shown, through a different terminal 6b. The transition may be done by having this second user register his presence at the terminal 6b manually, or by means of a operative connection between the terminals 6a, 6b (e.g. "Bluetooth"). Again, for illustrative purposes it will be assumed that the first terminal 6a and/or connection 7 is of more limited capability than the second facility 6b, 8.

Figure 2:
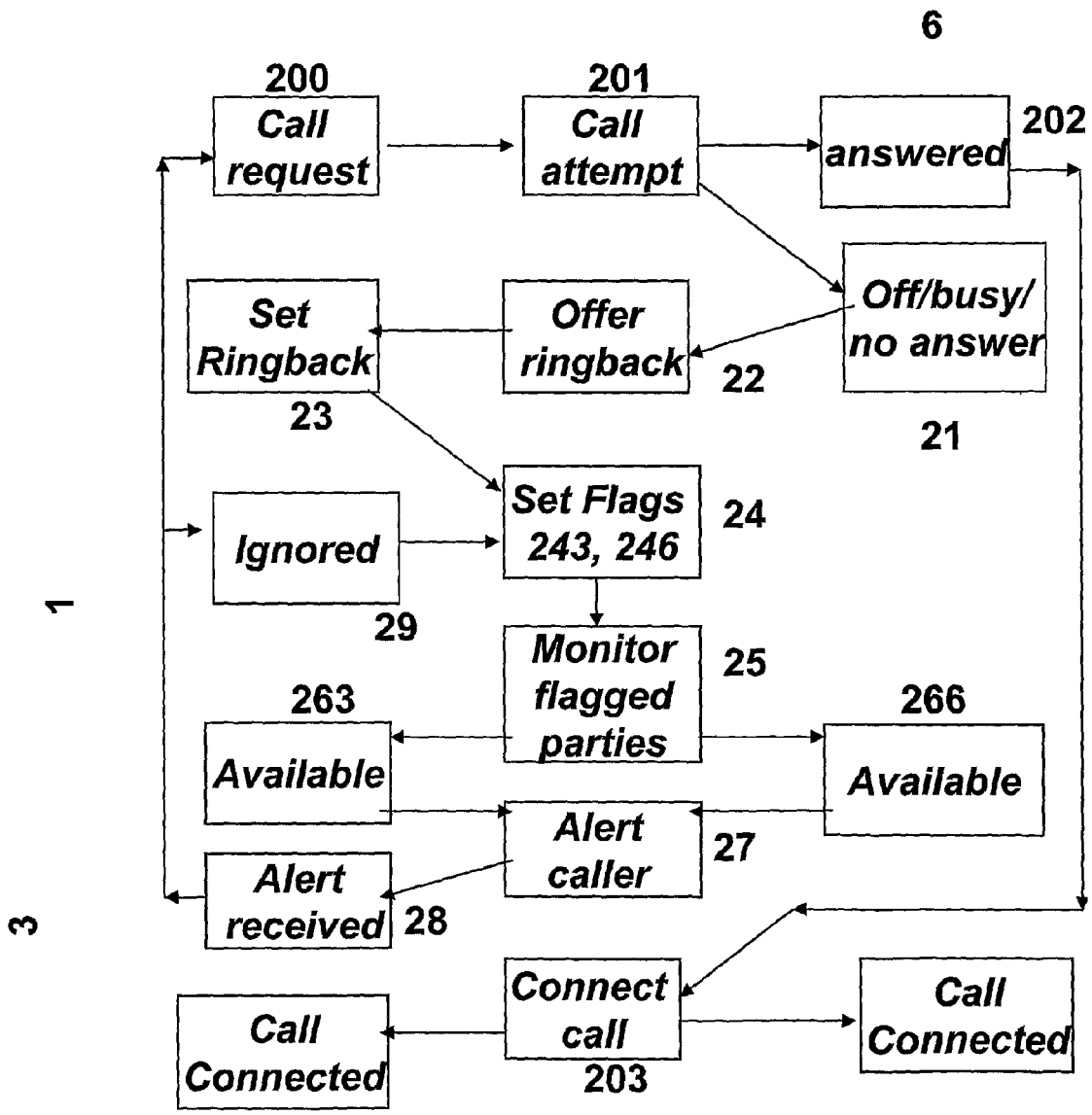
FIG. 2 is a flow diagram illustrating the operation of the invention.

Referring to FIG. 2, consider now a call request 200 made by the first user 3, who is connected to the network 9 using his terminal 3a by a high bandwidth connection 4, to communicate with the other user 6 (who may be connected through either connection 6a, 6b, or not at all). The call request is passed to the server 1, which attempts to contact the called party 6 (step 201). The call may be answered (202), in which case the connection can be completed (203). However, should the called party 6 currently be engaged on another call, or have his terminal switched off, or fail to answer the call (21), the callback server would, as in the conventional system, return a "call failed" message 22 from the network to the user 3, by transmitting a message prompting the user 3 to initiate a process 23 that sets a flag 246 in the store 2. The callback server 1 monitors terminals that have such flags set (25) and is arranged to transmit an alert 27 to the calling party 3 when the called party 6 next becomes available. Availability is conventionally identified by some action on the part of the called party 6, such as registering with the network 9 or, if already registered, when it next transitions from "off hook" to "on hook". (If a call attempt failed through "no answer", meaning the handset is already "on hook", the alert 27 is only generated once the user 6 has cycled to "off hook" and back to "on hook"). On receipt of the alert 28, the user 3 can make a second call attempt 200.

However, at the time when the called party 6 becomes available, it is possible that the calling party 3 is himself no longer available, being now switched off or busy. This problem is overcome in a first embodiment of the invention, as shown in FIG. 2, by setting an additional flag 243 in the store 2, indicative of activity by the calling party 3. The callback alert is only generated when the monitoring process 25 can obtain availability indications 263, 266 in respect of both parties 3, 6 simultaneously.

If the original cause of failure 21 of the original call attempt 200, 201 was "no answer" (line connected and on hook), this is indicative of a terminal that is sometimes unattended—this is of course more likely for a fixed terminal than a mobile one. The indication of availability in such cases is the "off-hook"/"on-hook" cycle, but this is only a reliable indicator of availability for a short period after the "on-hook". In the event that the calling party 3 is itself unavailable when this cycle occurs at the called party 6, there is a possibility that the called party 6 will again be unattended when the calling party 3 next becomes available, resulting in a failure of the callback. For this reason, availability indications 263, 266 generated by an "off-hook/on hook" cycle are arranged to time out after a predetermined period.

In the event that an alert 27 is generated and not acted upon by the calling party 3, despite being both switched on and "on hook" (step 29), the flag 243 is re-set with the availability criterion 261 for the calling party 3 arranged to monitor for the next "off-hook/on hook cycle" 261, again with a timeout applied. An alert 28 will therefore be generated when the following conditions are met:
1. both terminals are switched on and connected
2. both terminals are "on hook"

If the initial call attempt, or a subsequent callback attempt, fails as a result of one party failing to answer a call attempt or callback alert, a third condition is applied in respect of that party before a new alert is generated:
3. the terminal has been "off hook" within a predetermined timeout period.

Figure 3:
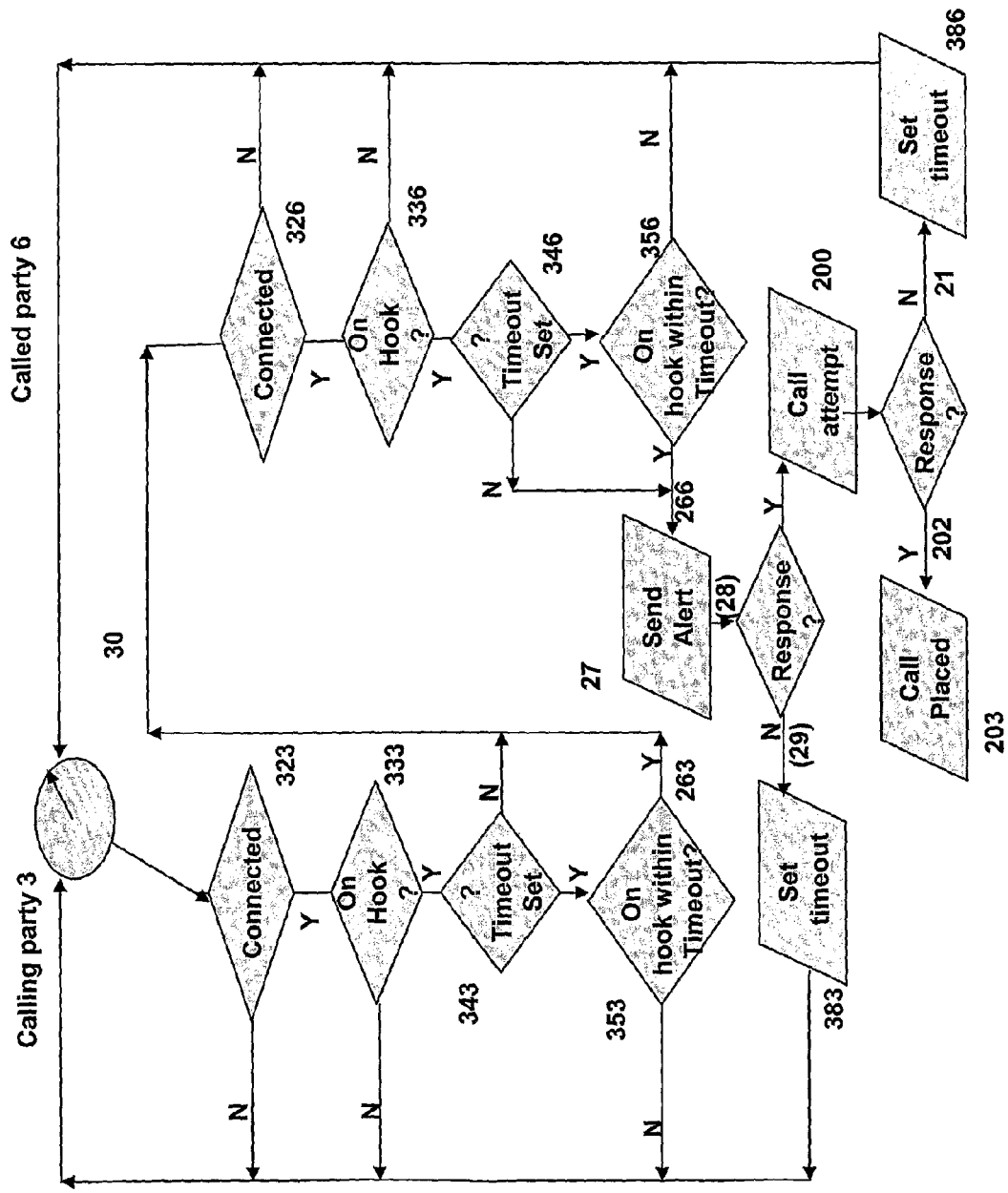
FIGS. 3, 4 and 5 are more detailed flow diagrams showing three embodiments of processes by which the availability of parties to a call attempt may be determined.

The process 25 for determining availability of the users 3, 6 operates as shown in FIG. 3. The status of both the calling party 3 and called party 6 are checked from time to time (either periodically 30 as represented in FIG. 3, or by simply cycling through all callback requests in turn). Both the calling party 3 and called party 6 are checked to determine whether the user is connected (313, 316) and on hook (333, 336). If a "timeout" flag has been set (343, 346) a further check is made (353, 356) to determine if the user has gone from "off hook" to "on hook" within the predetermined timeout period. If all the checks 313, 316, 333, 336 and (if applied) 353, 356 are positive, the callback alert 27 is sent to the calling party 3, which initiates a new call attempt 200, as shown in FIG. 2.

In the event that the calling party 3 fails to respond to the alert 27, the timeout flag 243 is set (383) so that on future cycles an alert 27 is only generated if the calling party has used the terminal 3 within a predetermined period. Similarly, if the call attempt is made and no response is received (21) from the called party 6, the timeout flag 246 is set for that party.

This embodiment increases the likelihood that a callback alert is only sent when it is likely to succeed in connecting the parties. However, at the time of the call attempt, the second user 6 may be connected to the network (not busy or switched off) but using a terminal 6a and/or connection 7 having limited capabilities. If the first user 3a attempts to send the other user 6a a large quantity of data which would take a very long time to download, or to attempt to discuss visual data not readable on the terminal 6a, the call, although connected, will be unsuccessful in achieving the intentions of the caller 3a. It would be preferable for the user 3 to wait until the called party 6 is using a more suitable terminal 6b and or connection 8. There is also the possibility that when these conditions are met, the caller himself may have moved to a less suitable connection 3b.

Figure 4:
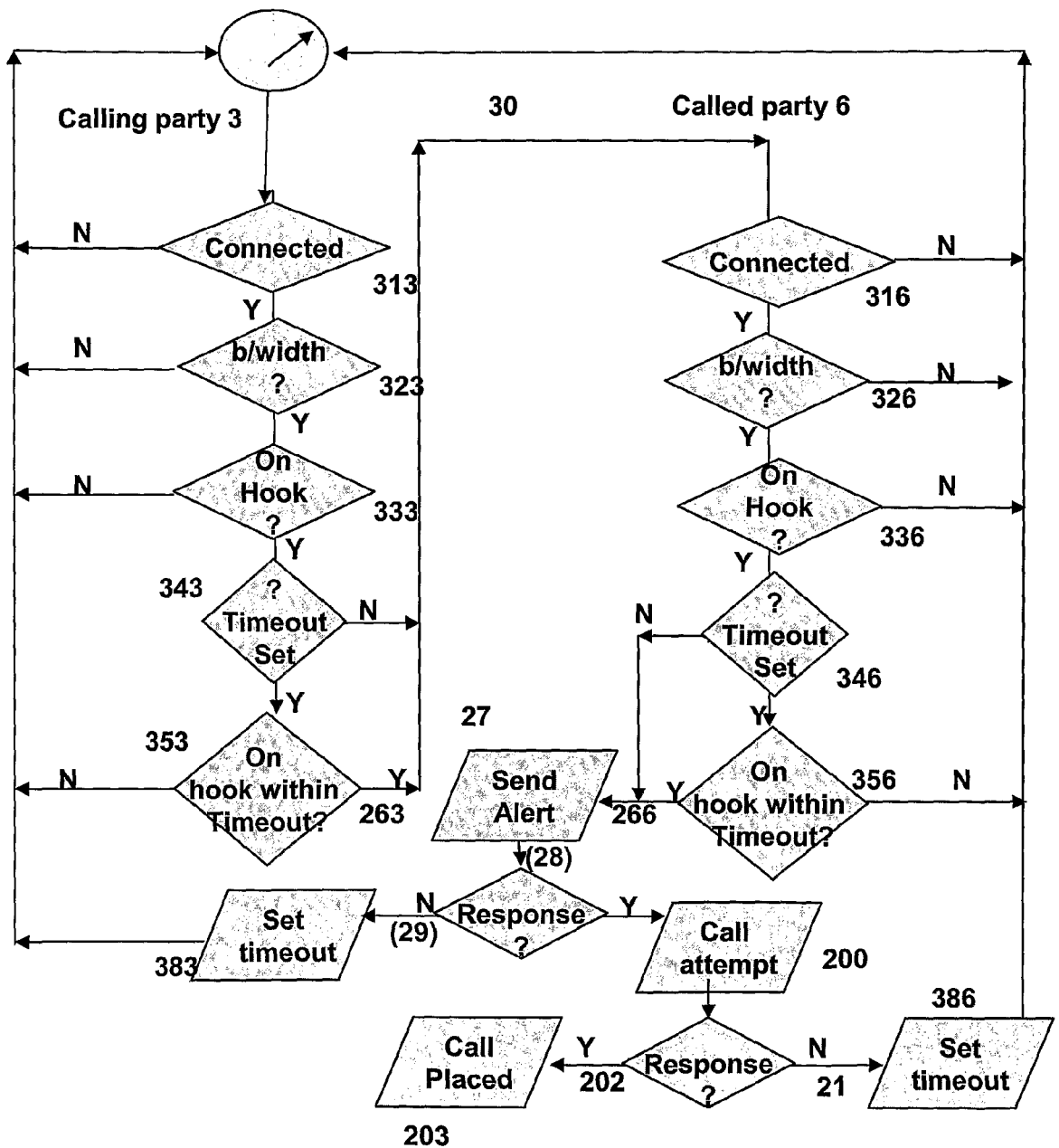

FIG. 4 illustrates an improved callback process which improves the success of the call attempts by ensuring that both users are connected by way of terminals and connections suitable for the proposed task. In this process the availability criteria 263, 266 are modified to include physical characteristics of the connection such as the type of terminal in use, and the available bandwidth (tests 323, 326) These criteria may be set by the calling party according to the nature of the communication required. For example, if the caller wishes to transmit a large data file, but it is not urgent, a callback may be requested for a time when both parties are connected to high bandwidth connections 4, 8. (It may also be appropriate to require that the called party's terminal 6b has sufficient memory to accept the data). If a video conference is required, a callback may be requested for a time when both parties are connected to terminals 3b, 6b having audio-visual capability, and appropriate bandwidth to support it.

The criteria for callback may be set up by the user to meet a "least-cost" principal, for instance a call may be set up between the parties only if both user terminals are connected to the same network, or a call may be set up only if neither party is on a cellular (GSM) connection.

The criteria may have a time element—for example they may be relaxed after a predetermined time, in order that limited contact can be made between the parties if it has not proved possible to establish a connection with the desired characteristics, or so that connection using a network with a time-variable tariff may be permitted at times when the tariff is below a specified threshold.

Figure 5:
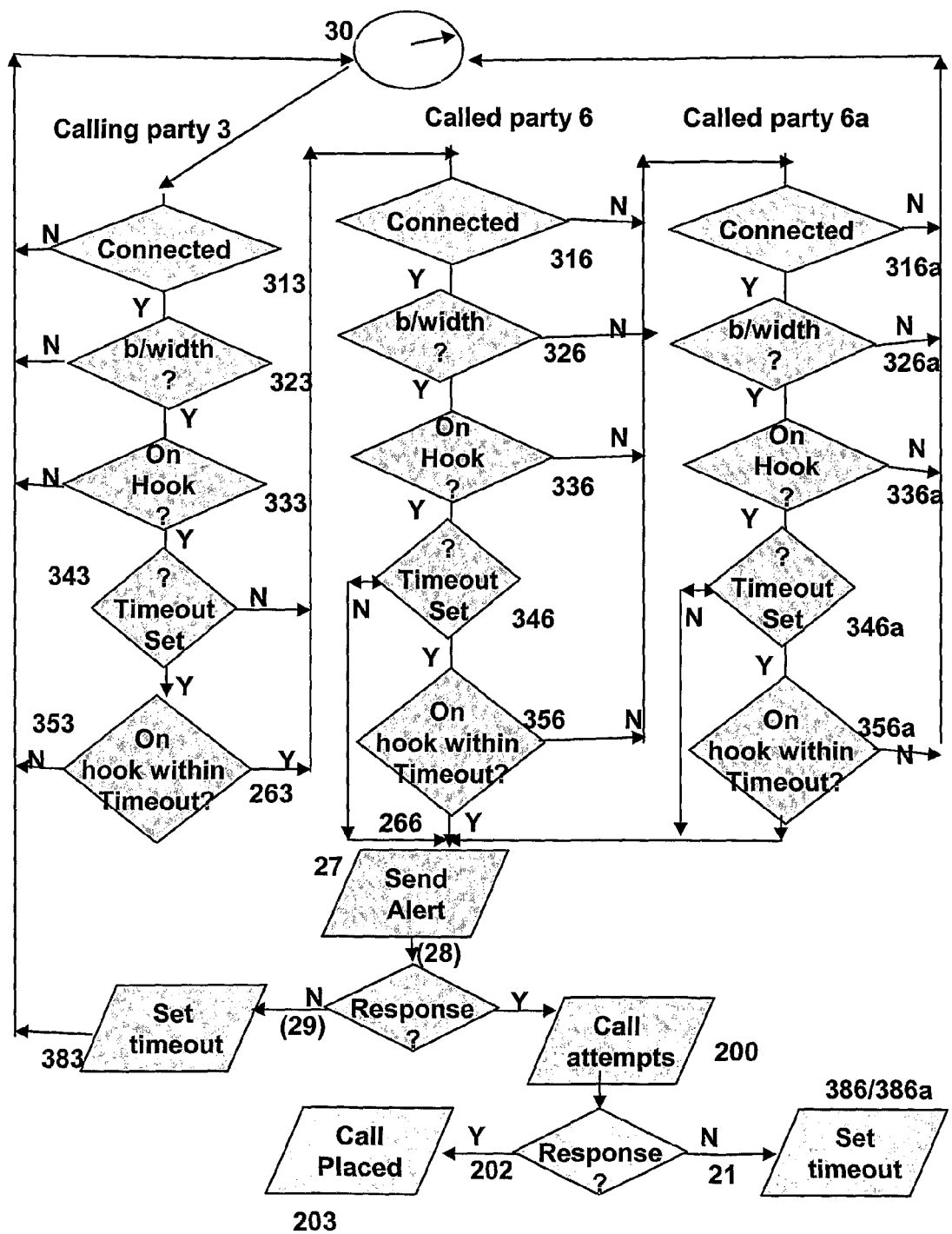

In embodiments described so far there are only two parties to the attempted call, but the invention may also be used to facilitate multiple-party calls (conference calls). Again, the criteria set by the calling party can allow a call attempt to be made when any one of the called parties, or a predetermined number of them, are identified as available. FIG. 5 illustrates such an arrangement. In this arrangement, a call alert is sent to the calling party 3 provided that at least one of the called parties (identified as 6, 6a), and the calling party 3 itself, meet the availability criteria prevailing at the time. The process is as for FIG. 4, except that if the called party 6 fails one of the tests 316, 326, 336, 356, the same tests 316a, 326a, 336a, 356a are applied to the other called party, and a call alert 27 is generated if either of them meet the specified criteria. Variations will be apparent to the person skilled in the art, for example a call alert may be generated if a predetermined number of the called parties (one, some, or all) meet the criteria.

The parties may be tested in parallel or, as shown in FIG. 5 for simplicity, the parties may be tested sequentially. A call alert is placed when any of the called parties is identified as available, so the status of any such parties not recently tested (in the current cycle if they are tested sequentially as shown in FIG. 5) is unknown. If it is desired to contact as many parties as possible, the resulting call attempt 200 may be sent to the called party 3 identified as available and also to any party 3a whose status has not been determined. However, if the calling party 3 only wishes to contact one of the called parties 3, 3a,—rather than as many of them as possible—he may instead choose to configure the system to contact only the first called party 3, 3a to meet the criteria.

What is claimed is:

1. A telecommunications system providing, a callback facility having means for detecting an attempt made by a first party to make a call of a predetermined type to one or more other parties, means for detecting a failure of said call attempt, means for monitoring each party to the call attempt to determine whether they are connected to the network by means of a connection having physical characteristics which meet criteria indicating that they are capable of supporting participation in a call of the type attempted, and means to generate a notification to the first party when the first party and one or more of the other parties meet the capability criteria.

2. A system according to claim 1, comprising means to monitor the bandwidth available to each party, and to generate the said notification when the bandwidth for one or more parties meets a predetermined value.

3. A system according to claim 1, comprising means to identify the capabilities of the terminal available to each party, and to generate the said notification when the terminals for one or more parties satisfy predetermined capability conditions.

4. A system according to claim 1, comprising means to generate the said notification when a predetermined number of the other parties meet the predetermined capability criteria.

5. A system according to claim 1, comprising means to vary the predetermined capability criteria with time.

6. A system according to claim 1, comprising means for changing the criteria for generating a callback alert if a first alert fails to result in a completed call.

7. A machine-implemented method of operating a telecommunications system providing a callback facility, said method comprising using a programmed callback server processor to operate by:

in the event of failure of a call attempt of a predetermined type being made by a first party to one or more other parties, monitoring each party to the call attempt to determine whether they are connected to the network by means of a connection having physical characteristics which meet criteria indicating that they are capable of supporting participation in a call of the type attempted, and sending a notification to the first party when the first party and at least one of the other parties meet the capability criteria.

8. A method according to claim 7, wherein the bandwidth available to each party is monitored, and the said notification is generated when the bandwidth for one or more parties meets a predetermined value.

9. A method according to claim 7, wherein the capabilities of the terminal available to each party is monitored, and the said notification is generated when the terminals for one or more parties satisfy predetermined capability conditions.

10. A method according to claim 7, wherein said notification to the first party is generated when a predetermined number of other parties meet the predetermined capability criteria.

11. A method according to claim 7, in which the capability criteria are allowed to vary with time.

12. A method according to claim 7, wherein the criteria for generating a callback alert are modified if a first alert fails to result in a completed call.

* * * * *